(12) United States Patent
Ording et al.

(10) Patent No.: US 9,690,447 B2
(45) Date of Patent: *Jun. 27, 2017

(54) DYNAMICALLY CHANGING APPEARANCES FOR USER INTERFACE ELEMENTS DURING DRAG-AND-DROP OPERATIONS

(71) Applicant: Apple Inc., Cupertino, CA (US)

(72) Inventors: Bas Ording, San Francisco, CA (US); Steve P. Jobs, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1168 days.

This patent is subject to a terminal disclaimer.

(21) Appl. No.: 13/681,385

(22) Filed: Nov. 19, 2012

(65) Prior Publication Data

US 2013/0145325 A1   Jun. 6, 2013

Related U.S. Application Data

(63) Continuation of application No. 12/582,284, filed on Oct. 20, 2009, now Pat. No. 8,316,321, which is a continuation of application No. 10/100,067, filed on Mar. 19, 2002, now Pat. No. 7,607,102.

(60) Provisional application No. 60/363,875, filed on Mar. 14, 2002.

(51) Int. Cl.
*G06F 3/048* (2013.01)
*G06F 3/0481* (2013.01)
*G06F 3/0486* (2013.01)

(52) U.S. Cl.
CPC ........ *G06F 3/04817* (2013.01); *G06F 3/0486* (2013.01)

(58) Field of Classification Search
CPC .......................... G06F 3/04817; G06F 3/0486
USPC .................. 715/846, 763, 861, 825
See application file for complete search history.

(56) References Cited

U.S. PATENT DOCUMENTS

| | | |
|---|---|---|
| 5,333,256 A | 7/1994 | Green et al. |
| 5,596,694 A | 1/1997 | Capps |
| 5,598,524 A | 1/1997 | Johnston, Jr. et al. |
| 5,742,286 A | 4/1998 | Kung et al. |
| 5,754,179 A * | 5/1998 | Hocker ................. G06F 3/0481 715/835 |
| 5,774,119 A | 6/1998 | Alimpich et al. |
| 5,880,729 A | 3/1999 | Johnston, Jr. et al. |
| 6,061,061 A | 5/2000 | Conrad et al. |
| 6,535,230 B1 | 3/2003 | Celik |

(Continued)

OTHER PUBLICATIONS

"Animated Icons", Research Disclosure, (Sep. 1989), 654 pgs.

(Continued)

*Primary Examiner* — Andrey Belousov
(74) *Attorney, Agent, or Firm* — Ronald S. Fernando (57) ABSTRACT

A user interface includes elements whose appearance dynamically changes in dependence upon functions associated with the elements. In the case of an icon that is the destination for a drag-and-drop operation, the image displayed for the icon changes in accordance with the object being dragged to it, to represent the task that will be performed as a result of the drag-and-drop operation. The appearance of other elements involved in drag-and-drop operations can also be varied, to reflect the task at hand. As a result, the user is provided with more intuitive feedback regarding the functions that will be performed by the computer as a result of a drag-and-drop operation.

23 Claims, 4 Drawing Sheets (56) References Cited

U.S. PATENT DOCUMENTS

| | | | |
|---|---|---|---|
| 6,690,356 | B2 | 2/2004 | Johnston, Jr. et al. |
| 6,848,081 | B1 | 1/2005 | Yoda et al. |
| 7,607,102 | B2 | 10/2009 | Ording et al. |
| 8,316,321 | B2 | 11/2012 | Ording et al. |

OTHER PUBLICATIONS

"U.S. Appl. No. 10/100,067, Advisory Action mailed Jan. 18, 2006", 3 pgs.
"U.S. Appl. No. 10/100,067, Appeal Brief filed Jan. 24, 2007", 15 pgs.
"U.S. Appl. No. 10/100,067, Appeal Brief filed May 5, 2006", 12 pgs.
"U.S. Appl. No. 10/100,067, Examiner Interview Summary mailed Jan. 6, 2006", 4 pgs.
"U.S. Appl. No. 10/100,067, Examiner's Answer to Appeal Brief mailed Jun. 1, 2007", 9 pgs.
"U.S. Appl. No. 10/100,067, Examiner's Answer to Appeal Brief mailed Jul. 14, 2006", 9 pgs.
"U.S. Appl. No. 10/100,067, Final Office Action mailed Jul. 5, 2005", 9 pgs.
"U.S. Appl. No. 10/100,067, Non Final Office Action mailed Jan. 27, 2005", 7 pgs.
"U.S. Appl. No. 10/100,067, Notice of Allowance mailed Mar. 6, 2009", 4 pgs.
"U.S. Appl. No. 10/100,067, Reply Brief filed Aug. 1, 2007", 3 pgs.
"U.S. Appl. No. 10/100,067, Reply Brief filed Sep. 14, 2006", 3 pgs.
"U.S. Appl. No. 10/100,067, Response filed Jan. 5, 2006 to Final Office Action mailed Jul. 5, 2005", 3 pgs.
"U.S. Appl. No. 10/100,067, Response filed Apr. 27, 2005 to Non Final Office Action mailed Jan. 27, 2005", 11 pgs.
"U.S. Appl. No. 12/582,284, Non Final Office Action mailed Apr. 12, 2012", 5 pgs.
"U.S. Appl. No. 12/582,284, Notice of Allowance mailed Jul. 19, 2012", 5 pgs.
"U.S. Appl. No. 12/582,284, Preliminary Amendment filed Feb. 26, 2010", 3 pgs.
"U.S. Appl. No. 12/582,284, Response filed Jul. 9, 2012 to Non Final Office Action mailed Apr. 12, 2012", 2 pgs.
"Enhanced Icon for Leading User through Drag and Drop Process", IBM Technical Disclosure Bulletin, vol. 39, No. 3, (Mar. 1, 1996), 121-122.
Bolt, Richard A, "Human Interfaces for Managers", Computerworld in Depth, (Jul. 16, 1984), 1-18.
Herot, et al., "A Prototype Spatial Data Management System", Computer Graphics Quarterly Report ofSIGGRAPH-ACM,, (Jul. 1980), 63-70.

\* cited by examiner

*Fig. 1*

| | Large | Small |
|---|---|---|
| Normal | IMG2A | IMG2B |
| Highlight | IMG2C | IMG2D |
| Dimmed | IMG2E | IMG2F |

DYNAMICALLY CHANGING APPEARANCES FOR USER INTERFACE ELEMENTS DURING DRAG-AND-DROP OPERATIONS

CROSS-REFERENCE TO RELATED APPLICATIONS

This application is a continuation of and claims the benefit of priority Under 35 U.S.C. 120 to U.S. patent application Ser. No. 12/582,284, filed on Oct. 20, 2009, which is a continuation of and claims the benefit of priority Under 35 U.S.C. 120 to U.S. patent application Ser. No. 10/100,067, filed on Mar. 19, 2002, and now issued as U.S. Pat. No. 7,607,102, which in turn claims the benefit of priority Under 35 U.S.C. 119(e) to U.S. Provisional Patent Application No. 60/363,875, filed on Mar. 14, 2002, the benefit of priority of each of which is claimed hereby, and each of which is incorporated by reference herein in its entirety.

FIELD OF THE INVENTION

The present invention generally relates to graphical user interfaces for computer systems, and more particularly to a user interface having elements that provide an intuitive appearance to depict an operation being performed.

BACKGROUND OF THE INVENTION

An important aspect of any computer system is the interface that allow a user to input commands and data, and to receive the results of operations performed within me computer. In the area of personal computers, the graphical user interface (GUI) has become almost ubiquitous. The most popular types of GUI are based upon a metaphor that emulates the desktop environment. These types of GUI employ various visual elements to assist the user in managing information within the computer. Two fundamental elements are windows and icons. Windows function as container elements, via which information is presented to the user, and in which the user enters data to be input to the computer. The main, or root window, is commonly referred to as the "desktop" area and functions as the primary display region. An icon comprises an image that is displayed on the desktop, or within another window, and represents a particular object. For instance, an icon may represent a file containing data or a program. An icon can also be employed to represent a window that has been closed or minimized, container objects such as folders, and computer resources such as disk drives and printers. Selecting an icon, for example by means of a mouse or other cursor control device, enables the user to access the information or resource represented by that icon.

Another feature of many GUIs, that facilitates the user's ability to interact with the computer, is the drag-and-drop operation. An example of this type of operation is disclosed in U.S. Pat. No. 5,598,524, the disclosure of which is incorporated herein by reference. In essence, the drag-and-drop operation enables the user to perform a function by simply dragging an icon representing the object on which the function is to be performed, and placing it upon another icon. For example, the user can copy a file onto a disk by dragging the icon for the file onto the icon for the disk. When the user releases the file icon while it is positioned over the disk icon, the user interface recognizes this as a command to copy the file onto the disk, and performs the required task. As another example, the user can cause a document to be printed, without having to open an application program, by simply dragging the document's icon onto a printer icon.

In some cases, the icon that forms the destination of a drag-and-drop operation can represent different tasks, depending upon the nature of the object being dragged to the icon. An example of this can be seen, for example, in the case of the "trash" icon that is employed in the Macintosh Operating System, provided by Apple Computer, Inc. A user drags an object to this icon when the user desires to remove the object from the computer system. For instance, if a document is to be deleted from the computer's file system, the user drags the icon for the document to the trash icon. In consonance with the desktop metaphor, the trash icon has the appearance of a garbage can, or wastebasket, to reinforce the user's understanding that the document being "deposited" on the trash icon is being disposed of.

In addition to the deletion of documents, files and folders, the trash icon can be employed to perform other functions. For example, the user can drag an image of a removable disk to the trash icon, which causes the disk to be automatically ejected from the disk drive of the computer. In this case, the user may not find the dragging of the disk icon to the image of a trash can to be intuitive. More particularly, placing an object in the trash can creates the impression that the object is being thrown away. However, it is not the user's intention to dispose of the removable disk, but merely to remove it from the computer housing. Hence, a novice met may be reluctant drag the image of a disk to the trash can for fear that it may perform an unwanted action, such as deleting all of the flies on the disk.

In some cases, therefore, the appearance of an element in a graphical user interface may not be consistent with a task that is being performed, particularly in those situations where the element is associated with more than one task. It is an objective of the present invention, therefore, to provide a graphical user interface in which the images associated with icons and other user interface elements provide intuitive feedback regarding the types of functionality associated with those elements.

SUMMARY OF THE INVENTION

In pursuit of this objective, the present invention provides a user interface having elements whose appearance dynamically changes in dependence upon characteristics of an object associated with a drag-and-drop operation. In one exemplary embodiment, if the element is an icon that is the destination for a drag-and-drop operation, the image displayed for the icon changes in accordance with the object being dragged to it, to represent the task that will be performed as a result of the drag-and-drop operation or to represent a characteristic of the object being dragged. The appearance of other elements involved in drag-and-drop operations can also be varied, to reflect the task at hand. These other elements can include the icon for the object being dragged, the cursor that is used to drag the icon, and control elements associated with resources involved in the task.

In the case of a trash icon, for example, its appearance can be mapped to the type of object being dragged to it. If the object is one that is to be deleted from the computer's file system, such as a document or folder, the trash icon can have the appearance of a disposal container, such as a wastebasket or garbage can. If the dragged object is a physical device that is to be removed from the computer, the trash icon can display an image associated with ejecting the device from the system. Other functions associated with various objects that can be dragged to the trash icon can similarly cause the appearance of the icon to change to an image appropriate to that function.

As a result, the user is provided with more intuitive feedback regarding characteristics of objects being dragged and/or the functions that will be performed by the computer as a result of a drag-and-drop operation.

Further features of the invention, and the advantages provided thereby, are explained in greater detail hereinafter, with reference to exemplary embodiments of the invention.

DETAILED DESCRIPTION

To facilitate an understanding of the features of the invention and the principles upon which it is based, exemplary embodiments are described hereinafter in which the appearance of icons are dynamically varied in accordance with a characteristic of an object being dragged to them, and/or the type of function that will be performed as a result of a drag-and-drop operation. It will be appreciated, however, that the references to icons are illustrative only. The principles which underlie the invention can be applied to any type of element employed within a graphical user interface, to provide users with more intuitive representations of the characteristics of objects within a computer system and/or the functions associated with those objects.

Figure 1:
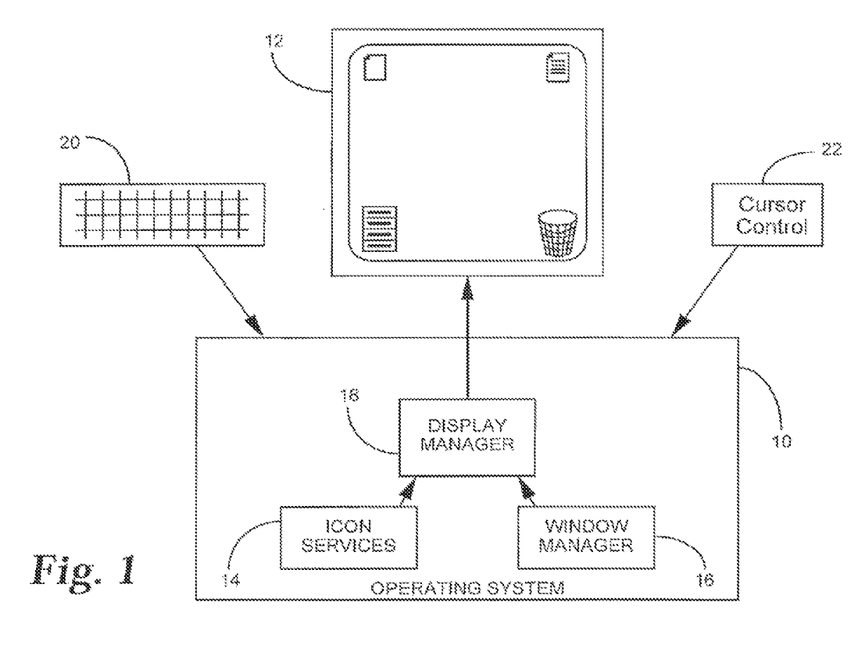
FIG. 1 is a block diagram of the general architecture of a computer system in which the present invention can be implemented.

FIG. 1 is a block diagram of the components of a personal computer that may be involved in the implementation of the present invention. Generally, the graphical user interface forms part of the computer's operating system 10. Examples of operating systems which provide a graphical user interface include the Macintosh® Operating System of Apple Computer, Inc., and the Windows® operating system provided by Microsoft Corporation. The graphical user interface employs various services of the operating system that are responsible for generating information that appears on the computer system's display 12, such as a CRT monitor or an LCD flat panel screen. These services include icon services 14, which control the appearance and position of icons on the display, and a windows manager 16, which controls the appearance, size and position of windows that appear on the screen. Each of these services communicates with a display manager 18 that also forms part of the operating system. The display manager is responsive to commands received from the icon services and the windows manager, and generates the signals that control the display 12 to present the designated images.

User input to the computer system is accomplished by means of a keyboard 20 and a cursor control device 22, such as a mouse, trackpad, pen, or the like. As is known, the user employs the cursor control device 22 to position a cursor appearing on the display, and actuates one or more control buttons to select and move objects, as well as to activate control elements to provide input. The movements of the cursor and actuation of the control buttons are fed as inputs to the appropriate elements of the operating system, to cause corresponding changes in the user interface appearing on the display 12. For example, when the user clicks a button on the cursor control device 22, the location of the cursor is supplied to the icon services 14, along with an indication that a button has been clicked. If an icon is being displayed at that location, the icon services can function to change the appearance of the icon, e.g. make it darker, to provide an indication that it has been selected as a result of the user action.

Figure 2:
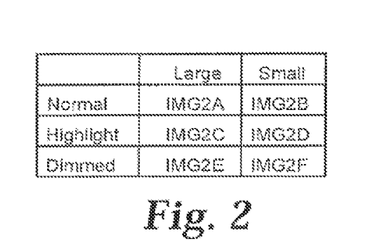
FIG. 2 illustrates a table containing data regarding different images associated with an icon.
Figure 2A:
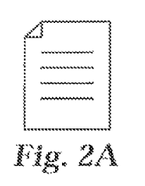
FIGS. 2A-2F illustrate the different images represented in the table of FIG. 2.
Figure 2B:
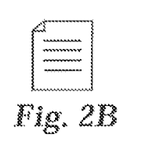
Figure 2C:
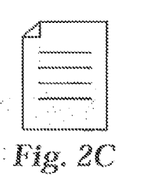
Figure 2D:
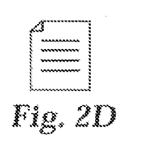
Figure 2E:
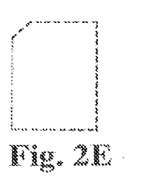
Figure 2F:
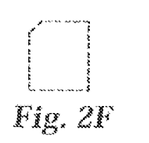

For this purpose, the icon for any given object may have a family of several different images. Some of these images may relate to different states of the object, whereas others may pertain to different user preference items. FIG. 2 illustrates an example of a table storing information about the family of icon images stored in connection with a particular object, in this case a document. The left side of the table illustrates three different states for the icon, namely normal, highlighted and dimmed. The top of the table depicts two different choices for a user preference item. In this example, the user has the ability to select whether large or small icons are to be displayed. Each combination of state and size has a stored icon image associated with it. FIG. 2A illustrates the image for the icon in its normal state and large size, whereas FIG. 2B illustrates the normal state and small size. FIGS. 2C and 2D illustrate the highlighted state of the icon, for the large and small sizes, respectively. FIGS. 2E and 2F illustrate the dimmed state of the icon, again for the large and small sizes. In dependence upon the state of the object associated with an icon and the user-chosen size, the icon services 14 selects the appropriate image and provides it to the display manager 18.

In accordance with the present invention, another dimension of variation is provided for icon images to reflect the characteristics of a drag-and-drop operation. In one embodiment of the invention, the icon representing the destination for a drag-and-drop operation has its appearance varied in dependence upon the task associated with the drag-and-drop operation.

Figure 3A:
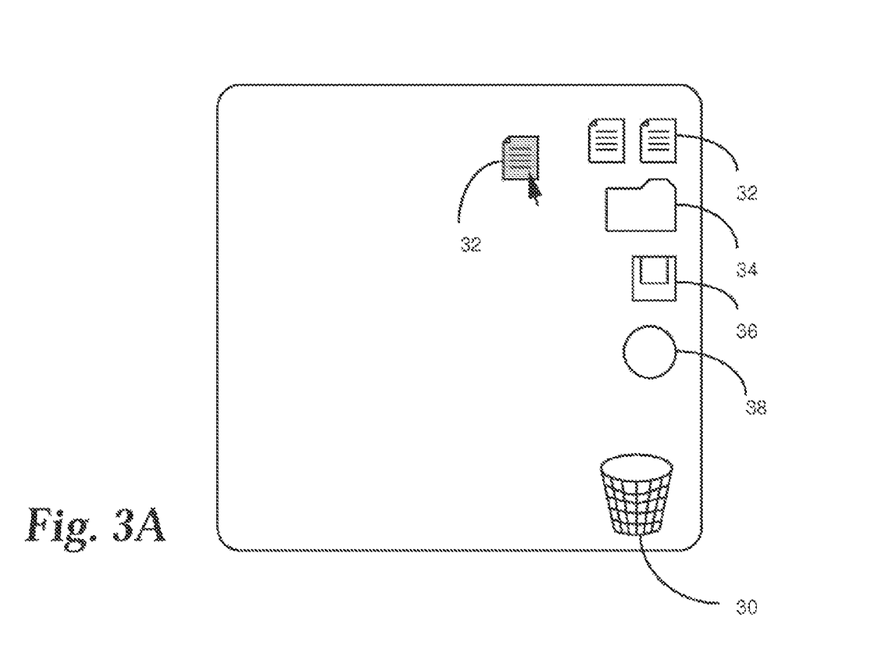
FIGS. 3A-3C are representative examples of a display, illustrating different appearances for a trash icon.
Figure 3B:
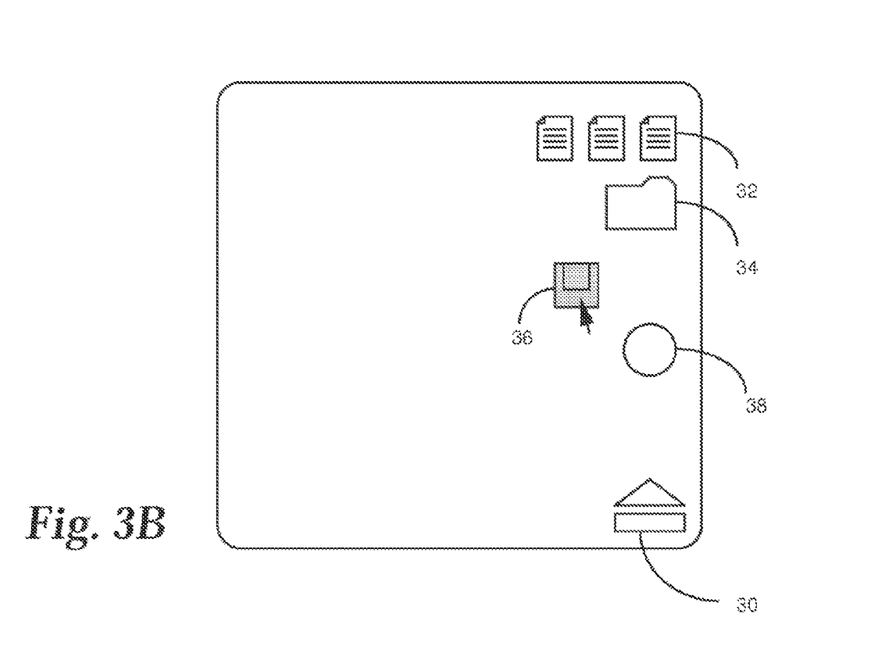
Figure 3C:
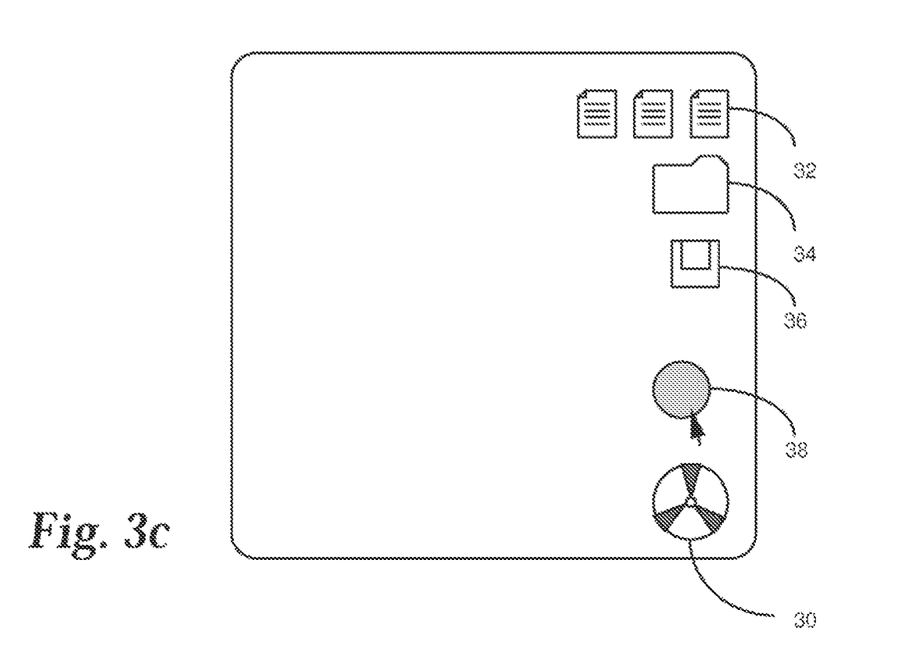

For example, with references to FIGS. 3A-3C, various types of objects can be dragged to a trash icon 30, to remove them from the computer system. For instance, as depicted in these figures, the user can drag a document 32, a folder 34, a floppy disk 36 or a compact disk (CD) 38 to the trash icon 30. In the case of documents 32 and folders 34, the effect of dragging them to fee trash icon is to delete them from the computer's file system. For this purpose, an appropriate image for the icon 30 is that of a container associated with the disposal of objects, such as a wastebasket as shown in FIG. 3A, or a garbage can. In the case of the floppy disk 36 and the CD 38, however, the act of dragging their icons to the trash icon 30 does not result in a deletion of those objects. Rather, it causes them to be ejected from the corresponding drive mechanisms in the computer. In this case, the image of a wastebasket or garbage can may not be suitable, since it does not provide the most appropriate metaphor for the task being implemented. In accordance with the present invention, therefore, when one of these types of objects is being dragged to the trash icon, the image for the icon is changed to symbolize the nature of the object, which determines the action that will be undertaken when the object is dropped onto the icon. FIG. 3B illustrates the situation in which the icon for the floppy disk 36 is being dragged to the trash. In this case, it can be seen that the appearance of the icon 30 has been changed to the image of a symbol which represents the ejection of an object from the system.

Figure 4:
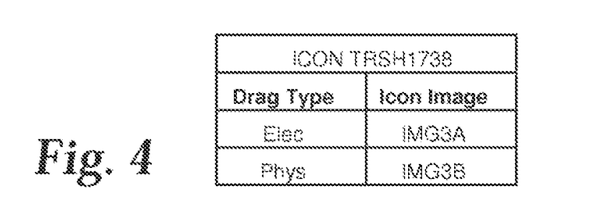
FIG. 4 is a mapping table of the different images for the trash icon.

In one implementation of the invention, the image that is displayed for the destination of a drag-and-drop operation can be based upon the type of object being dragged. In this regard, the operating system stores type information for each object that is stored in the computer system's memory. In the example described above, the determination of the appropriate image to display for the trash icon can be based upon whether the object is a physical object, such as a removable storage medium, or an electronic object, for example a file system object such as a folder or a file. For this purpose, the information that is stored in the icon services 14 for each icon can include a flag, or bit, that indicates whether multiple "personalities" are associated with the icon. If so, a mapping table is provided for the icon, that indicates the different images that are respectively displayed in association with the various personalities. An example of such a mapping table for the trash icon is illustrated in FIG. 4. The left column of the table depicts the different types of objects that can be dragged to the icon. In the case of the trash icon, for example, the objects are classified as physical or electronic. Each object type has an associated image that is stored in the icon services, and the mapping table includes a pointer to that image, e.g. IMG3A or IMG3B.

In operation, one of the images can be designated as the default image, and is displayed at all times except when an object of a predetermined type is being dragged. For instance, in the case of the trash icon, the default image could be the wastebasket depicted in FIG. 3A. This image is displayed at all times, except when the user is dragging an icon for a physical object. When the user selects a physical object, this information is provided to the icon services, which checks whether any icon currently being displayed has its flag set to indicate multi-image capability. If so, the icon image table for that icon is checked, to determine whether the object that has just been selected is of the type that requires a change in appearance. If so, the image data for the new appearance is retrieved and provided to the display manager 18, to cause the icon to change appearance, as illustrated in FIG. 3B.

The change in appearance can occur as soon as the object is selected. Alternatively, it may be preferable to wait until a selected object is being dragged by the user before determining whether to change the appearance of potential destination icons, to thereby minimize the frequency of appearance changes.

The foregoing example illustrates the situation in which two different functions are associated with the trash icon, namely to delete a file system object or eject a physical object such as a disk. It will be appreciated, however, that the number of functions is not limited, and each function can have a separate icon image associated with it. With further reference to the trash icon, it is possible to perform different kinds of operations on an object to be removed, depending upon the state of the object. For example, the CD icon 38 may represent a blank CD that the user has inserted into computer's disk drive. The user can drag the icons for one or more documents 32 onto the icon for the CD 38, to indicate that the user desires to store copies of the document on the CD. However, each file is not automatically copied, or "burned" onto the CD as it is dropped onto the icon 38. Rather, it is necessary for the user to explicitly indicate that the burn operation is to take place, preferably after all of the desired files have been dragged to the CD icon 38. If the user drags the CD icon 38 to the trash icon 30 before initiating the burn operation, the image that is displayed for the trash icon can be a burn symbol, as illustrated in FIG. 3C. This image advises the user that there are files to be burned onto the CD before it is ejected from the computer. If the user completes the drag-and-drop operation, a dialog window can be displayed, to have the user confirm that the burn operation should take place before the CD is ejected.

Figure 5:
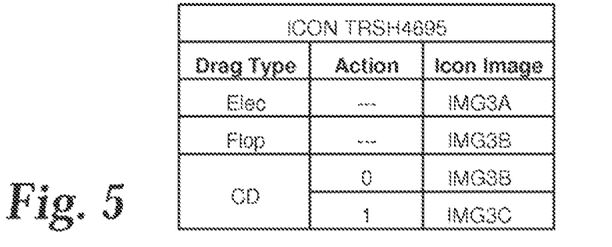
FIG. 5 is a mapping table for a second embodiment of the invention.

FIG. 5 illustrates an example of an icon image mapping table for this embodiment of the invention. In this case, the operating system distinguishes between different types of removable physical objects. If the object is a floppy disk, the eject symbol image is displayed, as in the example of FIG. 3B. If, however, the object is a CD, a further determination is made with respect to the state of the CD, namely whether there is information to be burned onto it. This might be determined, for example, by reference to the state of an action flag associated with the icon. If the flag is set, indicating that there is information to be stored on the CD, the burn symbol image, depicted in FIG. 3C, is displayed. Otherwise, the eject symbol image of FIG. 3B is displayed.

Figure 6A:
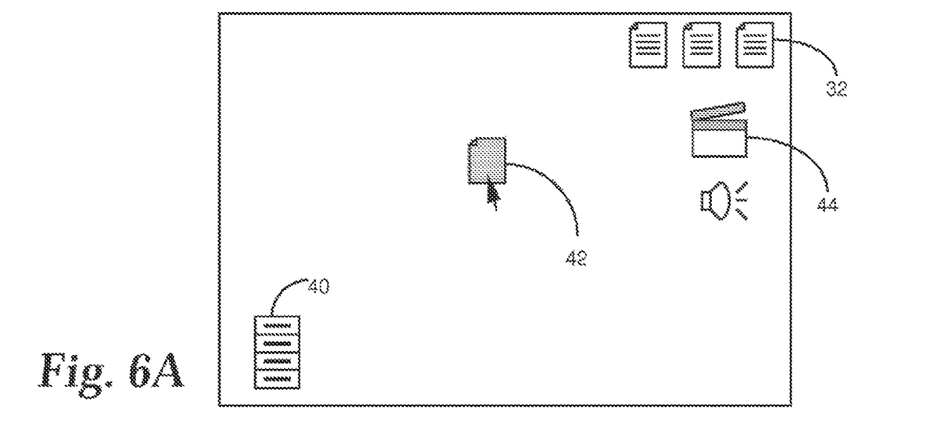
FIGS. 6A-6C are representative examples of a display, illustrating another embodiment of the invention.
Figure 6B:
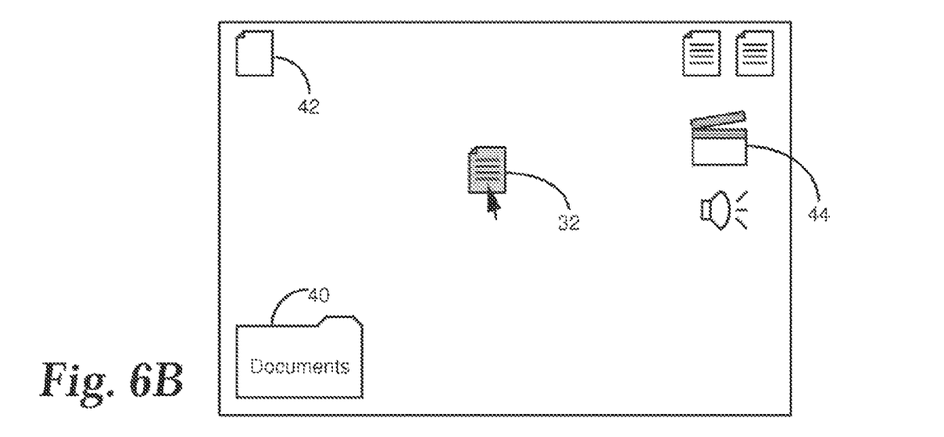
Figure 6C:
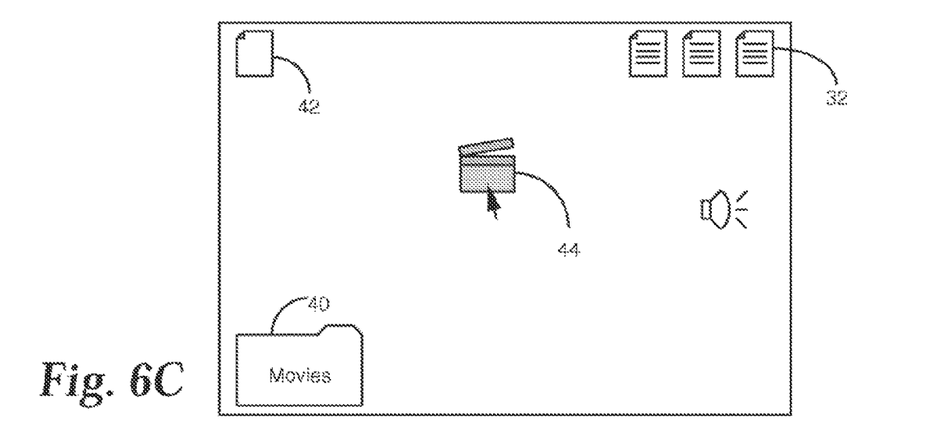

While the foregoing embodiments of the invention have been described with reference to the trash icon, it will be appreciated that the principles of the invention can be employed for any user interface element associated with a drag-and-drop operation. For instance, an icon might be associated with the computer's file system, such as the Finder icon associated with the Macintosh® Operating System. An example of a file system icon 40 is illustrated in FIG. 6A. When a user drags a file 42 to this icon, the file is stored in the computer's file system. Depending upon the type of file, it can be stored in different folders within the file system. In accordance with the present invention, the image that is displayed for the file system icon can change, in accordance with the area in which the file is to be stored. For instance, as shown in FIG. 6B, if the user drags a text file 32 to the file system icon, the icon 40 might appear as a "Documents" folder, to indicate that the file is being stored in that folder. Conversely, if the user drags a movie file 44 to the file system icon 40, the appearance of that icon can change to a "Movies" folder, as shown in FIG. 6C. Thus, rather than generically informing the user that the file is being stored within the file system, the change in appearance of the file system icon 40 provides the user with better feedback regarding the precise location at which the file is being stored.

As another example, the user may drag a file to a printer icon, to cause the file to be printed. Depending upon the nature of the file, it may be sent to one of several different printers. For example, a black and white text file may be sent to a monochrome printer, whereas a color graphics file may be sent to a higher resolution, color printer. In this situation, the icon for the printer can change appearance, to indicate the particular printer to which the dragged file will be sent.

From the foregoing, therefore, it can be seen that the present invention provides the user with more intuitive feedback regarding the tasks that are performed as a result of a drag-and-drop operation. In these examples, the appearance of the icon which functions as the destination for the drag-and-drop operation is changed, in accordance with the result to be accomplished. It will be appreciated, however, that other elements of the user interface can have similar behavior. For instance, it may be preferable to change the appearance of the icon being dragged, in addition to, or lieu of, the destination icon. Likewise, the cursor that is used to drag the icon can change its appearance, to provide an indication of the operation being performed.

In a further aspect of the invention, the dynamic icon functionality can be extended to application programs that are aware of this feature in the user interface. More particularly, an application having such an awareness can provide the icon services with an image that is to be displayed by a particular icon whenever an object associated with that application is selected. For instance, the developer of a drawing program may create an image of an eraser that is to be employed whenever a drawing created with that program is to be deleted, to symbolize a slate being wiped clean. When the drawing program is installed on a computer, it can supply this image to icon services along with an identification of the icon to which it is to be applied, i.e. the trash icon, and the type of object with which it is to be associated, e.g. files with the extension "dwg". This information is added to the tables such as those depicted in FIGS. 4 and 5. Subsequently, when a drawing object is selected, the image of the eraser is displayed for the trash icon.

It will be appreciated by those of ordinary skill in the art that the present invention can be embodied in other forms without departing from the spirit or essential characteristics thereof. The presently disclosed embodiments are therefore considered in all respects to be illustrative and not restrictive. The scope of the invention is indicated by the appended claims, rather than the foregoing description, and all changes that come within the meaning and range of equivalence thereof are intended to be embraced therein.

The invention claimed is:

1. A method comprising:
at a device with a display and one or more input devices:
displaying, on the display, a graphical user interface that includes a first selectable graphical element, a second selectable graphical element, and a target object, wherein:
the first selectable graphical element is associated with a first type of operation that is capable of being performed upon a first object through interaction of the first selectable graphical element with the target object;
the second selectable graphical element is associated with a second type of operation, different from the first type of operation, that is capable of being performed upon a second object through interaction of the second selectable graphical element with the target object; and
the target object has a first appearance;
while displaying, on the display, the graphical user interface that includes the first selectable graphical element, the second selectable graphical element, and the target object with the first appearance, detecting, via the one or more input devices, a user input selecting a respective selectable graphical element displayed in the graphical user interface; and
in response to detecting the user input:
in accordance with a determination that the respective selectable graphical element is the first selectable graphical element, changing appearance of the target object from the first appearance to a second appearance that corresponds to the first type of operation that is capable of being performed upon the first object through interaction between the first selectable graphical element and the target object; and
in accordance with a determination that the respective selectable graphical element is the second selectable graphical element, maintaining the appearance of the target object as the first appearance, wherein the first appearance corresponds to the second type of operation that is capable of being performed upon the second object through interaction between the second selectable graphical element and the target object.

2. The method of claim 1, further comprising:
performing the first type of operation on the first object in response to detecting movement of the first selectable graphical element upon the target object in the graphical user interface.

3. The method of claim 2, wherein the first selectable graphical element and the target object are respective icons, and wherein the user input is a drag-and-drop operation enabling movement of the first selectable graphical element over the target object in the graphical user interface.

4. The method of claim 1, wherein changing the appearance of the target object includes changing the appearance of the target object from a first icon to a second icon, and wherein changing the appearance occurs in response to selection of the first selectable graphical element in the graphical user interface.

5. The method of claim 1, wherein the target object represents a destination to which the first object can be moved or copied.

6. The method of claim 1, wherein the first type of operation is used to perform an action for removal of the first object from a computer system.

7. The method of claim 1, wherein the first type of operation is used to perform an action for storage of the first object in a computer system.

8. A computing device, comprising:
a display device;
one or more input devices;
a processor; and
a memory configured for storing instructions for execution that when executed by the processor cause the computing device to:
generate, for display on the display device, a graphical user interface that includes a first selectable graphical element, a second selectable graphical element, and a target object, wherein:
the first selectable graphical element is associated with a first type of operation that is capable of being performed upon a first object through interaction of the first selectable graphical element with the target object;
the second selectable graphical element is associated with a second type of operation, different from the first type of operation, that is capable of being performed upon a second object through interaction of the second selectable graphical element with the target object; and
the target object has a first appearance;
while the graphical user interface that includes the first selectable graphical element, the second selectable graphical element, and the target object with the first appearance is displayed on the display device, detecting, via the one or more input devices, a user input selecting a respective selectable graphical element displayed in the graphical user interface; and
in response to detecting the user input:
in accordance with a determination that the respective selectable graphical element is the first selectable graphical element, changing appearance of the target object from the first appearance to a second appearance that corresponds to the first type of operation that is capable of being performed upon the first object through interaction between the first selectable graphical element and the target object; and in accordance with a determination that the respective selectable graphical element is the second selectable graphical element, maintaining the appearance of the target object as the first appearance, wherein the first appearance corresponds to the second type of operation that is capable of being performed upon the second object through interaction between the second selectable graphical element and the target object.

9. The computing device of claim 8, wherein the target object is associated with storage operations for electronic objects in the computing device, and wherein the first appearance and the second appearance designate different storage operations.

10. The computing device of claim 9, wherein the different storage operations include different destinations for the electronic objects.

11. The computing device of claim 8, wherein the first appearance and the second appearance are used to indicate respective file system destinations for file system operations initiated from interaction of the first selectable graphical element or the second selectable graphical element with the target object.

12. The computing device of claim 8, wherein the user input selecting the respective selectable graphical element displayed in the graphical user interface results in a selection of the first object and a selection of a task associated with the first object.

13. A computer readable storage medium comprising a computer program operable in a computing device, the computer program comprising instructions for:
   displaying, on a display, a graphical user interface that includes a first selectable graphical element, a second selectable graphical element, and a target object, wherein:
      the first selectable graphical element is associated with a first type of operation that is capable of being performed upon a first object through interaction of the first selectable graphical element with the target object;
      the second selectable graphical element is associated with a second type of operation, different from the first type of operation, that is capable of being performed upon a second object through interaction of the second selectable graphical element with the target object; and
      the target object has a first appearance;
   while displaying, on the display, the graphical user interface that includes the first selectable graphical element, the second selectable graphical element, and the target object with the first appearance, detecting, via one or more input devices, a user input selecting a respective selectable graphical element displayed in the graphical user interface; and
   in response to detecting the user input:
      in accordance with a determination that the respective selectable graphical element is the first selectable graphical element, changing appearance of the target object from the first appearance to a second appearance that corresponds to the first type operation that is capable of being performed upon the first object through interaction between the first selectable graphical element and the target object; and
      in accordance with a determination that the respective selectable graphical element is the second selectable graphical element, maintaining the appearance of the target object as the first appearance, wherein the first appearance corresponds to the second type of operation that is capable of being performed upon the second object through interaction between the second selectable graphical element and the target object.

14. The computer readable storage medium of claim 13, wherein the computer program further comprises instructions for:
   performing the first type of operation upon the first object in response to detecting movement of the first selectable graphical element over the target object in the graphical user interface.

15. The computer readable storage medium of claim 14, wherein the movement of the first selectable graphical element over the target object is facilitated by a drag-and-drop operation in the graphical user interface to place the first selectable graphical element over the target object.

16. The computer readable storage medium of claim 13, wherein changing the appearance of the target object from the first appearance to the second appearance is performed in response to movement of the selectable graphical element.

17. The computer readable storage medium of claim 13, wherein the appearance of the target object is changed to represent a destination to which the first object can be moved or copied.

18. The computer readable storage medium of claim 13, wherein the target object is associated with removal of a selected object from the computing device, wherein the appearance of the target object is changed to one of a first image or a second image, wherein the first image and the second image correspond to whether the selected object is a physical object or an electronic object associated with the computing device.

19. The computer readable storage medium of claim 13, wherein the first type of operation includes a storage operation in the computing device, wherein the appearance of the target object is changed to designate a particular storage operation with the first object.

20. The computer readable storage medium of claim 19, wherein the storage operation pertains to different respective destinations in the computing device.

21. The method of claim 1, wherein the second type of operation is unavailable for performance upon the first object.

22. The computing device of claim 8, wherein the second type of operation is unavailable for performance upon the first object.

23. The computer readable storage medium of claim 13, wherein the second type of operation is unavailable for performance upon the first object.

* * * * *